(12) United States Patent
Joo

(10) Patent No.: US 7,345,375 B2
(45) Date of Patent: Mar. 18, 2008

(54) WIND POWER GENERATION APPARATUS

(76) Inventor: Jang Sik Joo, 435-3, Deokjin-Dong 2-Ga, Deokjin-Gu, Jeonju-Si, Jeollabuk-Do 561-852 (KR)

( * ) Notice: Subject to any disclaimer, the term of this patent is extended or adjusted under 35 U.S.C. 154(b) by 115 days.

(21) Appl. No.: 10/596,624

(22) PCT Filed: Jan. 11, 2005

(86) PCT No.: PCT/KR2005/000086

§ 371 (c)(1),
(2), (4) Date: Jun. 19, 2006

(87) PCT Pub. No.: WO2005/076762

PCT Pub. Date: Aug. 25, 2005

(65) Prior Publication Data

US 2007/0018463 A1    Jan. 25, 2007

(30) Foreign Application Priority Data

Jan. 13, 2004   (KR) ...................... 10-2004-0002321

(51) Int. Cl.
*F03D 9/00* (2006.01)
(52) U.S. Cl. .......................................... 290/55; 290/44
(58) Field of Classification Search .................. 290/43, 290/44, 54, 55
See application file for complete search history.

(56) References Cited

U.S. PATENT DOCUMENTS

| | | | | |
|---|---|---|---|---|
| 4,101,244 | A | * | 7/1978 | Grotberg ..................... 416/41 |
| 4,113,408 | A | * | 9/1978 | Wurtz et al. .................. 416/17 |
| 4,346,305 | A | | 8/1982 | White |
| 4,496,283 | A | | 1/1985 | Kodric |
| 4,545,729 | A | * | 10/1985 | Storm ..................... 416/132 B |
| 5,182,458 | A | * | 1/1993 | McConachy ................. 290/55 |
| 6,160,336 | A | * | 12/2000 | Baker et al. .................. 310/74 |
| 6,320,273 | B1 | * | 11/2001 | Nemec ......................... 290/55 |

FOREIGN PATENT DOCUMENTS

| | | |
|---|---|---|
| WO | WO 0144656 | 6/2001 |
| WO | WO 03102412 | 12/2003 |

* cited by examiner

*Primary Examiner*—Nicholas Ponomarenko
(74) *Attorney, Agent, or Firm*—IPLA P.A.; James E. Bame

(57) ABSTRACT

Disclosed relates to a wind power generation apparatus and, more particularly, to a multi-direction wind power generation apparatus, which can be easily, solidly and largely manufactured and also repaired readily, for enhancing the efficiency of power generation by making most us of wind and by lessening the wind resistance. The object of the present invention is to provide the multi-direction wind power generation apparatus that can generate electricity against the wind blowing from various directions, enhance the efficiency of electric generator by lessening the wind resistance maximally, and increase the solidity of the apparatus by establishing separate supporters for supporting the upper/lower support frames.

7 Claims, 5 Drawing Sheets

[Fig. 1]
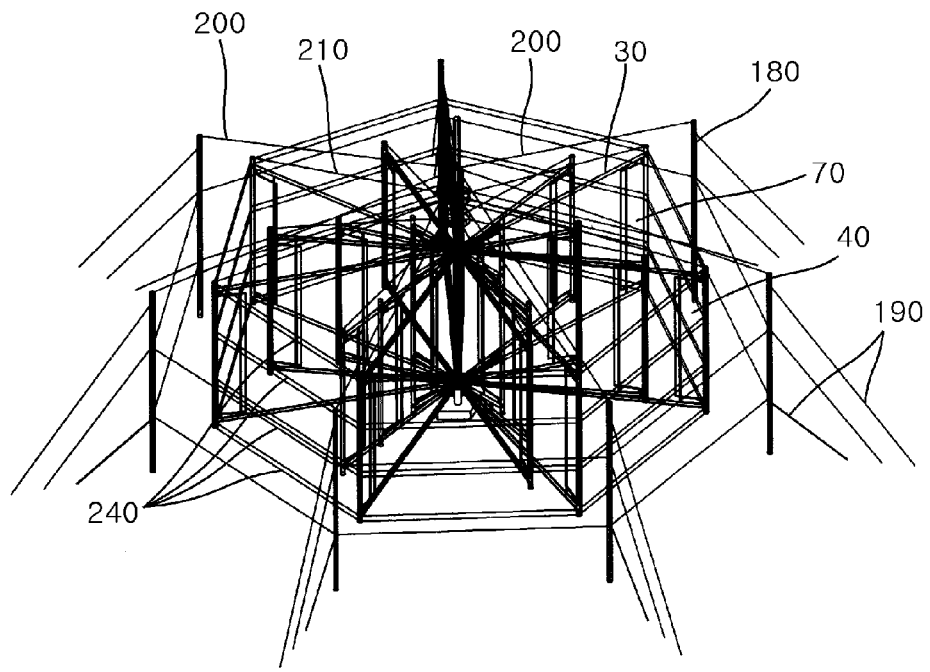
[Fig. 2]
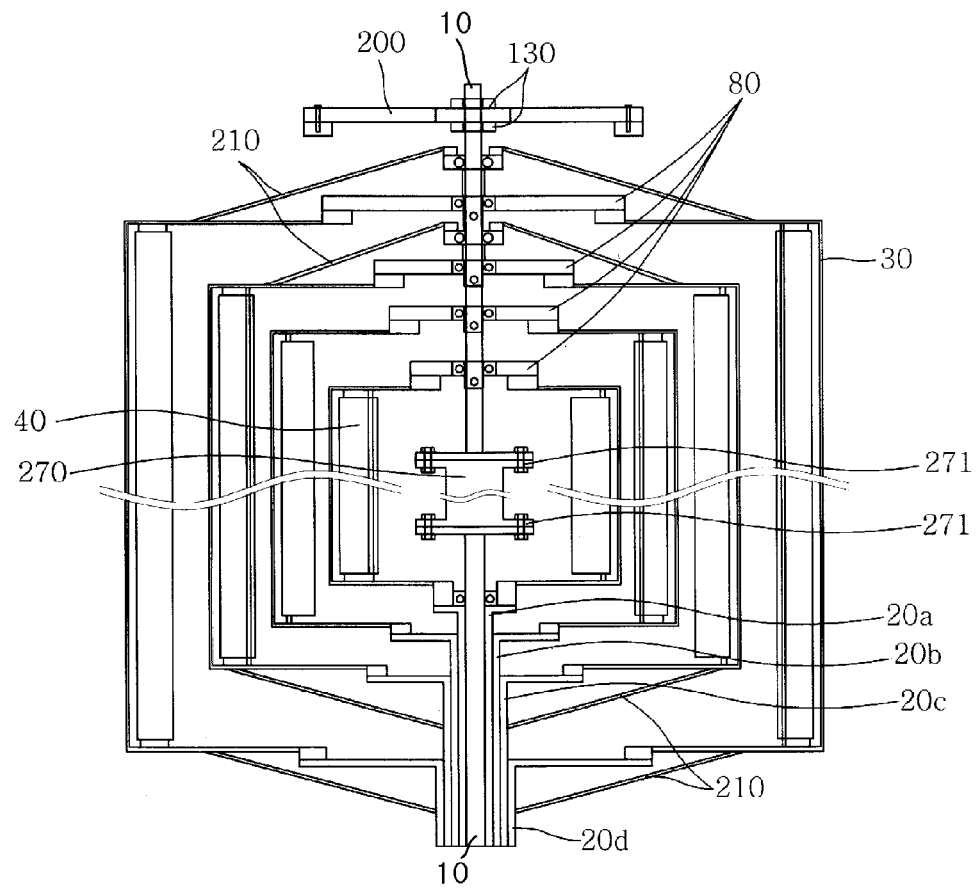

[Fig. 3]
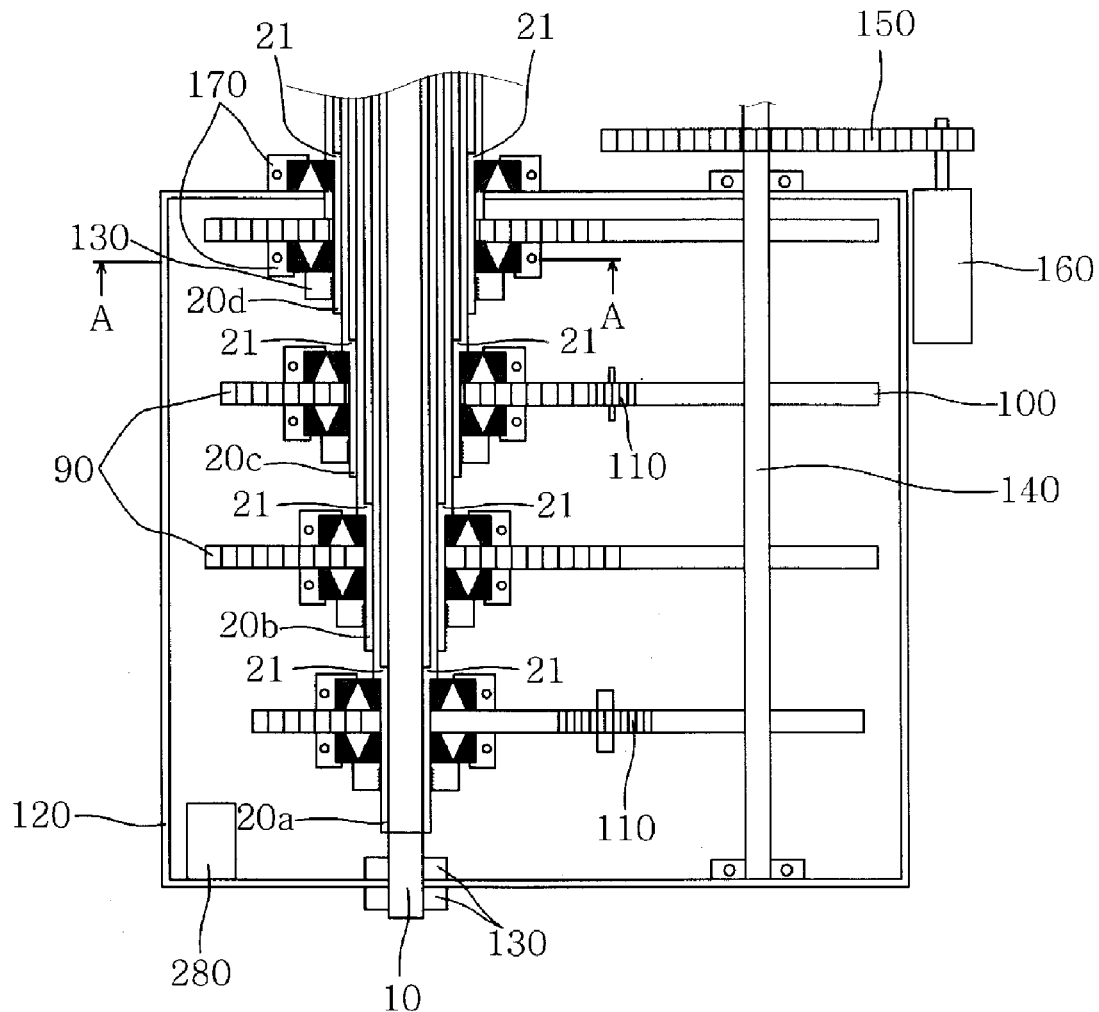
[Fig. 4]
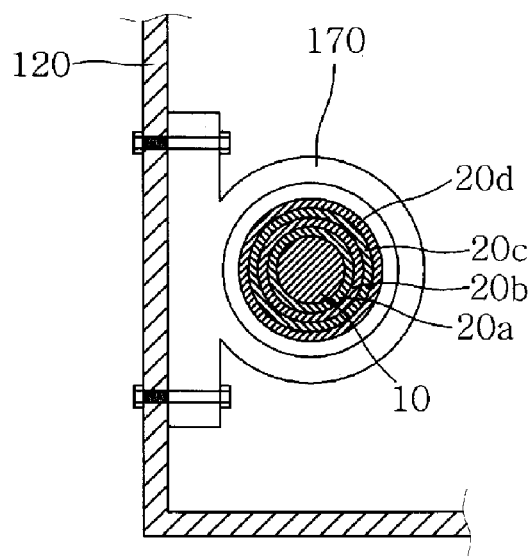

[Fig. 5]
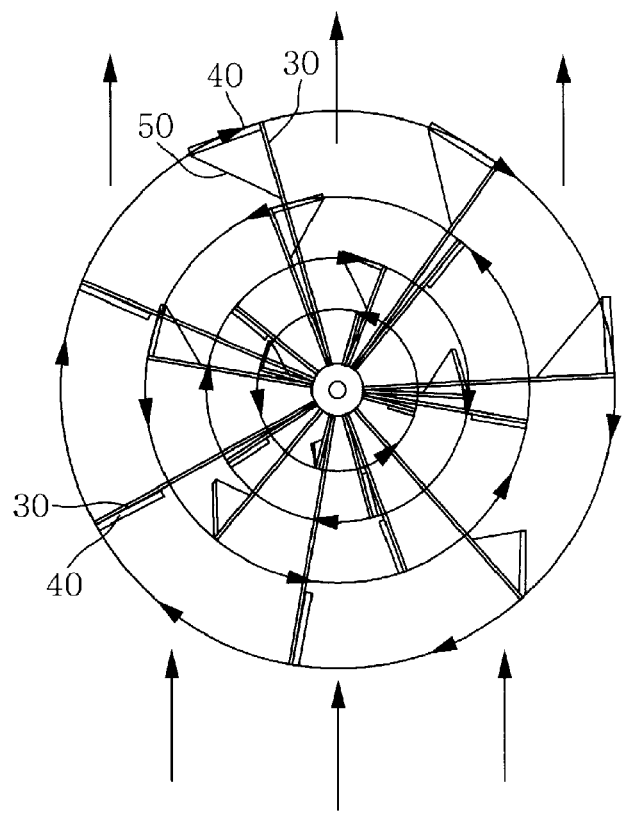
[Fig. 6]
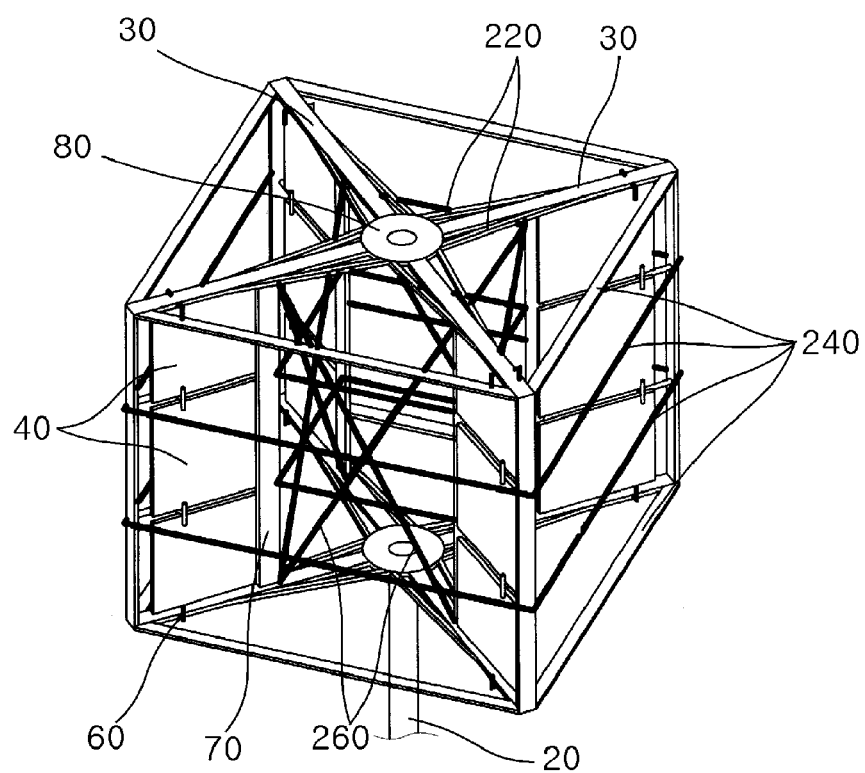

[Fig. 7]
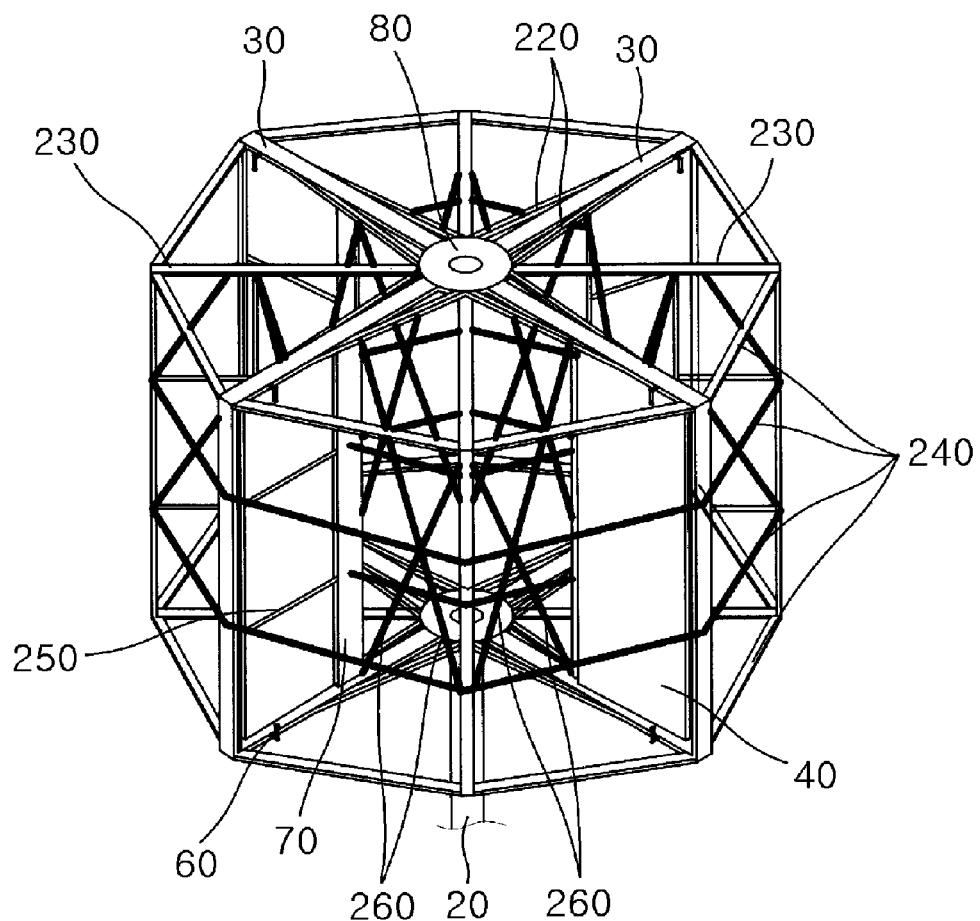
[Fig. 8]
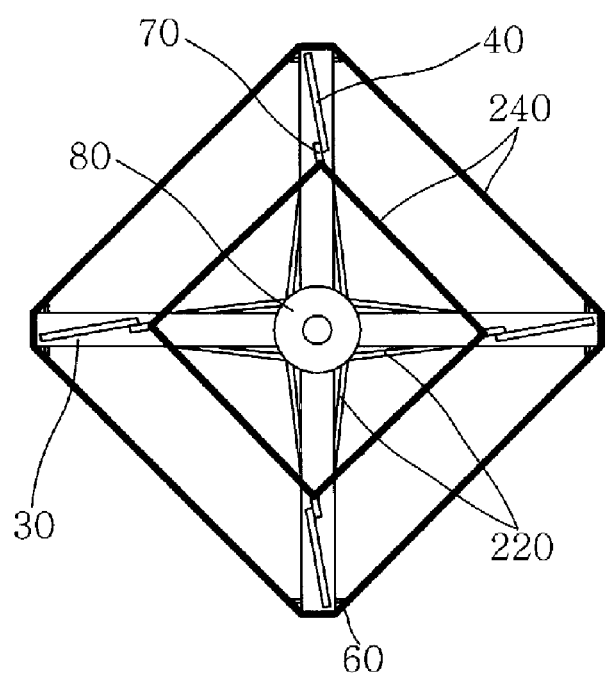

[Fig. 9]
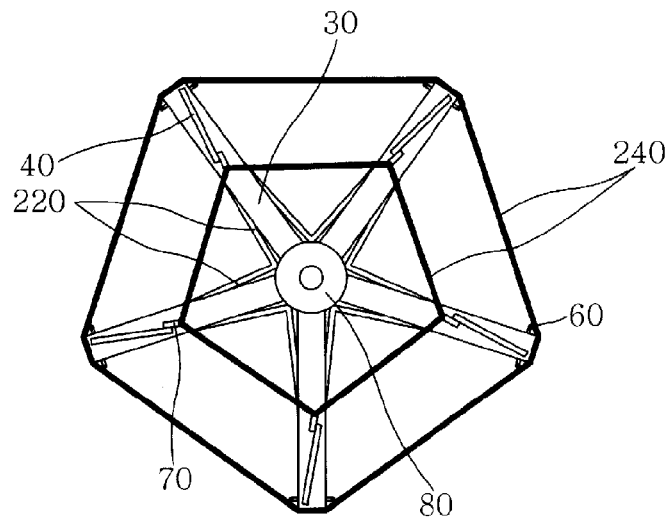
[Fig. 10]
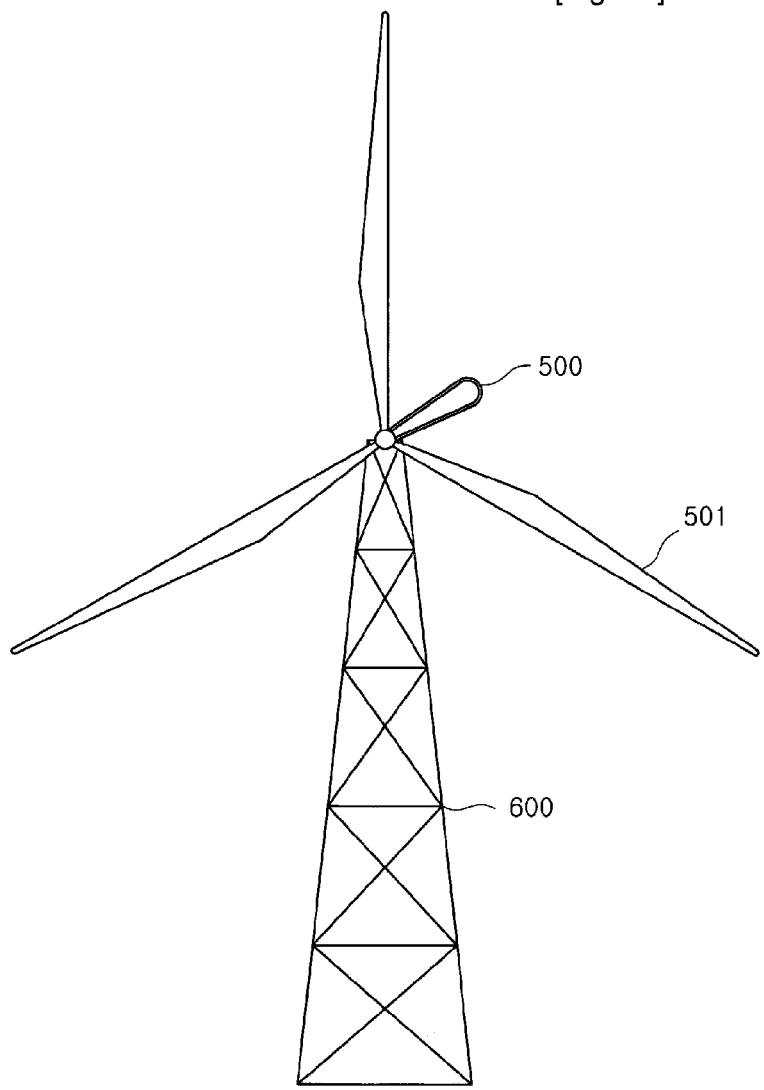

WIND POWER GENERATION APPARATUS

TECHNICAL FIELD

The present invention relates to a wind power generation apparatus and, more particularly, to a multi-direction wind power generation apparatus, which can be easily, solidly and largely manufactured and also repaired readily, for enhancing the efficiency of power generation by making most us of wind and by lessening the wind resistance.

BACKGROUND ART

Generally, the wind power generator generates electricity using natural wind and its configuration is as follows.

FIG. 10 is a front view showing a general wind power generator.

As shown in the figure, the general wind power generator includes a vane 501 rotated by the wind, an electric generator 500 generating electricity by the rotation power of the vane 501 and a support frame 600 supporting the electric generator 500 and the vane 501.

The aforementioned wind power generator including a plurality of vanes having a predetermined length radially from the rotation axis have some drawbacks described hereinafter. When a portion of the vanes is rotated by the wind, the other portion of the vanes disturbs the rotation of the vanes due to their own weights. That is, since the vanes have differences between rotation radiuses as much as they go along with ends from the rotation axis, the monolithic vane that rotates at the same angle deteriorates the efficiency of the electric generator by offsetting the rotation powers of the respective portions.

Besides, the aforementioned wind power generator requires separate apparatus for adjusting the vanes to the wind direction since the vanes can be rotated only when the vanes face the wind, thus causing difficulties in manufacturing the wind power generator.

Accordingly, the present inventor has disclosed a multi-direction wind power generation apparatus, which overcomes the aforementioned drawbacks of the general wind power generator, in Korean Patent Application No. 2002-0057952.

The general multi-direction wind power generator includes a plurality of upper/lower support frames, having different lengths from each other, mounted on outer circumference of a plurality of pivots, having different diameters from each other, inserted in turn into a central axis of a base frame, provided vertically on the ground; vane plates for rotating the pivots, which are established on ends of the upper/lower support frames and rotated or suspended under the influence of the wind; rotation control means, provided on the upper/lower support frames, for controlling the rotation of the vane plates; and rotation power transmission means, mounted on a lower part of the central axis of the base frame, for transmitting rotation powers of the pivots by means of predetermined gear mechanisms; and an electric generator, for generating electricity by receiving the rotation power from the rotation power transmission means, wherein the lower part of the central axis, which transmits the rotation power generated by the vane plates by means of the gear mechanisms, includes a driving gear, established on each end of the pivots inserted into the central axis, a follower gear axis having follower gears engaged with the driving gears in different proportions respectively, a transmission gear, mounted on an end of the follower gear axis by penetrating a lower portion of a gear case having the ends of the pivots, the driving gears and the follower gear axis, and an electric generation gear, engaged with the transmission gear, for transmitting the rotation power to the electric generator.

When the wind blows from a certain direction, the plural vane plates of the multi-direction wind power generator having the above configuration are rotated under the influence of the wind, or suspended by means of the rotation control means. Here, the pivots are rotated under the influence of the wind when the vane plates are suspended and, when the vane plates are rotated under the influence of the wind, the wind resistance lessens, thus reducing the diminution of rotation power of the pivots.

The rotation power of the pivots is transmitted to the electric generator by means of the plural gear mechanisms established underneath.

However, the rotation power may be diminished due to sudden increases of resistivity caused when the adjacent plural vane plates are faced with the wind resistance blowing from a certain direction at a time, since the multi-direction wind power generator includes the rotation control means for controlling the rotation of the plural vane plates, provided on the ends of the upper/lower support frames mounted on the plural pivots, rotated or suspended under the influence of the wind so as to rotate the pivots.

Besides, in establishing the upper/lower support frames extended in the horizontal direction on the upper/lower parts of the pivots, the length of the upper/lower support frame is limited due to its own weight and the weight of the vane plates mounted on the ends thereof, thus making it difficult to manufacture a large-sized wind power generator. In addition, the upper/lower support frames may be destroyed by an excessive wind velocity since the upper/lower support frames have no separate supporters.

DISCLOSURE OF INVENTION

Technical Problem

The present invention is designed in consideration of the above drawbacks in the prior art and, an object of the invention is to provide a multi-direction wind power generation apparatus that can generate electricity against the wind blows from various directions, enhance the efficiency of the electric generator by reducing the wind resistance maximally and increase the solidity of the wind power generation apparatus by establishing separate supporters for supporting the upper/lower support frames.

Technical Solution

To accomplish the above object, the present invention provides a multi-direction wind power generation apparatus, in a multi-direction wind power generation apparatus including a central axis mounted vertically on the ground; a plurality of pivots inserted rotatably into the central axis; a plurality of upper/lower support frames established on outer circumference of the plural pivots at regular intervals; vane plates, which are provided on the outside of the upper/lower support frames and rotated or suspended by the wind so as to rotate the pivots; rotation control means for controlling rotation angles of the vane plates; driving gears, mounted on bottoms of the pivots, for transmitting rotation power of the pivots; a follower gear axis including follower gears for receiving the rotation powers from the driving gears; and an electric generator for generating electricity by receiving the rotation power of the follower gear axis, wherein the rotation control means interfere with different sides of vane plates, respectively, so that the vane plates of the plural pivots adjacent to each other are rotated reversely to each other, the multi-direction wind power generation apparatus further comprising: a gear case, established under the pivots, including the driving gears, the follower gears and the follower gear axis; bearing units, provided on upper/lower sides of the driving gears mounted on the bottoms of the pivots and one side of the bearing unit is fixed inside the gear case, for supporting the pivots; and idle gears, engaged with lower driving gears of the pivots rotating in a reverse direction, for converting rotation directions of the pivots that are rotated in the reverse direction when the pivots adjacent to each other are rotated in the reverse direction according as the vane plates are rotated in the reverse direction under the influence of the wind.

More desirably, a support frame supporting means is further provided to strongly support the upper/lower support frames.

BRIEF DESCRIPTION OF THE DRAWINGS

FIG. 1 is a schematic perspective view showing a multi-direction wind power generation apparatus in accordance with the present invention;

FIG. 2 is a sectional view illustrating major elements of the multi-direction wind power generation apparatus in accordance with the present invention;

FIG. 3 is a sectional view depicting the inside of a gear case of the multi-direction wind power generation apparatus in accordance with the present invention;

FIG. 4 is a sectional view cut along with a line of AA in FIG. 3;

FIG. 5 is a schematic diagram explaining operations of the multi-direction wind power generation apparatus in accordance with the present invention;

FIG. 6 is a perspective view showing support frames and vane plates of the multi-direction wind power generation apparatus in accordance with the present invention;

FIG. 7 is a perspective view illustrating another example of the support frame and the vane plate of the multi-direction wind power generation apparatus in accordance with the present invention;

FIGS. 8 and 9 are cross-sectional views depicting the support frame and the vane plate of the multi-direction wind power generation apparatus in accordance with the present invention; and FIG. 10 is a front view showing a general wind power generator.

MODE FOR THE INVENTION

Hereinafter, reference will be made in detail to the multi-direction wind power generation apparatus of the present invention with reference to the accompanying drawings.

FIG. 1 is a schematic perspective view showing a multi-direction wind power generation apparatus in accordance with the present invention; FIG. 2 is a sectional view illustrating major elements of the multi-direction wind power generation apparatus in accordance with the present invention; FIG. 3 is a sectional view depicting the inside of a gear case of the multi-direction wind power generation apparatus in accordance with the present invention; FIG. 4 is a sectional view cut along with a line of AA in FIG. 3; FIG. 5 is a schematic diagram explaining operations of the multi-direction wind power generation apparatus in accordance with the present invention; FIG. 6 is a perspective view showing support frames and vane plates of the multi-direction wind power generation apparatus in accordance with the present invention; FIG. 7 is a perspective view illustrating another example of the support frame and the vane plate of the multi-direction wind power generation apparatus in accordance with the present invention; and FIGS. 8 and 9 are cross-sectional views depicting the support frame and the vane plate of the multi-direction wind power generation apparatus in accordance with the present invention.

As depicted in the drawings, the multi-direction wind power generation apparatus of the present invention includes: a central axis 10 mounted on the ground vertically; a plurality of pillars 180 established on the ground at regular intervals along with a circle having a predetermined radius from a center of the central axis 10, the pillars 180 being securely tied by pillar wires 190 fixed on the ground; and external frames 200, provided between the central axis 10 and the pillars 180, for supporting the central axis 10.

Besides, the multi-direction wind power generation apparatus of the present invention further includes: a plurality of pivots 20 inserted in turn into the central axis 10; a plurality of upper/lower frames 30 established on outer circumference of the pivots 20; vane plates 40, mounted on ends of the upper/lower support frames 30, rotating in a horizontal direction under the influence of the wind; wires 50, provided on the upper/lower support frames 30, as rotation control means for controlling the rotation of the vane plates 40; rotation suspending projections 60; and rotation preventive bars 70, wherein the wires 50 as rotation control means, the rotation suspending projections 60 and the rotation preventive bars 70 are established to interfere with different faces of the vane plates 40 in turn from each other, thus rotating adjacent vane plates 40 in the reverse direction to each other.

That is, according to a preferred embodiment of the present invention, the central axis 10 has first, second, third and fourth pivots 20a, 20b, 20c and 20d inserted in turn into the central axis 10 and, the plural upper/lower support frames 30 are established on the outer circumference of the first, second, third and fourth pivots 20a, 20b, 20c and 20d. Here, the number of the upper/lower support frames 30 established on the outer circumference of the first, second, third and fourth pivots 20a, 20b, 20c and 20d is set to four at the first pivot 20a, five at the second pivot 20b, six at the third pivot 20c and seven at the fourth pivot 20d, respectively.

On the other hand, it is possible to set the respective numbers of the upper/lower support frames and the first to fourth pivots 20a to 20d to few or many, according as the width of the vane plate 40 is set to narrow or wide.

Besides, the upper parts of the upper/lower support frames 30 of the first, second, third and fourth pivots 20a, 20b, 20c and 20d are fixed on outer circumference of rotation bearing units 80 put on the central axis 10.

The vane plates 40 influenced by the wind are arranged on the ends of the respective upper/lower support frames 30 and, the rotation preventive bars 70 and the wires 50 for controlling the rotation of the vane plates 40 are established on the respective upper/lower support frames 30.

The rotation preventive bar 70 is installed vertically between the upper/lower support frames 30, and the wire 50 is connected between an end of the vane plate 40 and the rotation preventive bar 70.

Particularly, the rotation preventive bars 70, the wires 50 and the rotation suspending projections 60, established on the upper/lower frames 30 of the second and fourth pivots 20b and 20d, are arranged to interfere with the same face of the vane plates 40, whereas, the rotation preventive bars 70, the wires 50 and the rotation suspending projections 60, established on the upper/lower frames 30 of the first and third pivots 20a and 20c, are arranged to interfere with the other face of the vane plates 40 of the first and third pivots 20a and 20c opposite to the vane plates of the second and fourth pivots 20b and 20d.

Meanwhile, a driving gear 90 for transmitting the rotation powers of the first to third pivots 20a to 20d is established under the first to third pivots 20a to 20d, respectively, and a follower gear 100 is engaged with the driving gear 90 to receive the rotation power. Since the first and third pivots 20a and 20c have a rotation direction reverse to that of the second and fourth pivots 20b and 20d, an idle gear 110 for converting the rotation direction is further provided, respectively, on the two driving gears 90 of the first and third pivots 20a and 20c, or the second and fourth pivots 20b and 20d.

A gear case 120 including the driving gears 90, the follower gears 100 and the idle gears 110 is established under the plural pivots 20. The central axis 10, into which the pivots 20 are inserted, is fixed on the bottom of the gear case 120 by nuts 130. A follower gear axis 140 having the follower gears 100 at regular intervals is provided penetrating one side of the gear case 120. A transmission gear 150 for transmitting the rotation power to an electric generator 160 is engaged with the follower gear axis 140 penetrated.

Besides, lube oil filled in the gear case 120 is sprinkled on the contact parts of the driving gear 90, the following gear 100 and the idle gear 110 by means of an oil pump 280, thus smoothing the rotation between various bearings and gears, and preventing superheat.

Meanwhile, on the upper and lower sides of the respective driving gears 90 mounted under the first to fourth pivots 20a to 20d, a bearing unit 170 is fixed on the first to fourth pivots 20a to 20d, respectively, and also fixed in the gear case 120, thus supporting the first to fourth pivots 20a to 20d. Especially, the bearing unit 170 provided on the upper side of the driving gear 90 of the fourth pivot 20d is fixed on the outside of the gear case 120 and, the nuts 130 are put into the lower sides of the bearing units 170 under the respective driving gears 90, thus strongly supporting the first to fourth pivots 20a to 20d.

In addition, it is possible to support the first to fourth pivots 20a to 20d by putting bent projections 21 in bearings of the bearing unit 170, the bent projections 21 having shortened diameters formed by cutting lower sides of the first to fourth pivots 20a to 20d.

On the upper end of the central axis 10, nuts 130 are provided to prevent the separation of the upper/lower support frames 30. Besides, the external frames 200 are fixed on the upper end of the central axis 10 to maintain the central axis 10 vertically on the ground.

Meanwhile, a plurality of upper/lower supporters 210 are further provided to support the upper/lower support frames 30 in the vertical direction, wherein an end of the upper/lower supporter 210 is fixed rotatably on the central axis 10 and the other end of the upper/lower supporter 210 is fixed on one side of the upper/lower parts of the upper/lower support frame 30.

Besides, a plurality of reinforcing supporters 220 connecting the rotation bearing unit 80, the pivots 20 and the upper/lower support frames 30 are established to reinforce the upper/lower support frames 30

Auxiliary support frames 230 having a shape of "⊓" are provided between the upper/lower support frames 30 mounted on the outer circumference of the pivots 20.

Cross-support members 240 are installed to surround the inner/outer circumferences of the upper/lower support frames 30 and the inner/outer circumferences of the auxiliary support frames 230 in the horizontal direction, thus supporting the lateral direction of the upper/lower support frames 30.

In addition, though it is possible to apply the cross-support members 240 for surrounding the inner/outer circumferences of the upper/lower support frames 30, not establishing the auxiliary support frames 230 of "⊓" shape, the rotation of the vane plates 40 may be disturbed by the cross-support members 240. Accordingly, it is feasible to divide the vane plates 40 numerously, in order not to disturb the rotation of the vane plates 40 by the cross-support members 240.

When applying the cross-support members to surround the circumference of the upper/lower support frames 30 and the auxiliary support frames 230, the cross-support members may bend the upper/lower support frames 30 and the auxiliary support frames 230 by their tightening forces. Accordingly, bend preventive members 250 are further provided to prevent the upper/lower support frames 30 and the auxiliary support frames 30 from being bent. The bend preventive members 250 are connected with the rotation preventive bars 70 for preventing the rotation of the vane plates 40 in predetermined positions within the upper/lower support frames 30, through which the cross-support members 240 go. Besides, the bend preventive members 250 are established in the shape of lattice within the auxiliary support frames 230, through which the cross-support members 240 go.

In addition, cross-support bars 260 are provided to connect the rotation preventive bars 70 with each other established on the plural upper/lower support frames 30 mounted on the outer circumference of the pivots 20. Both ends of the cross-support bar 260 having a shape of "X" are fixed to the rotation preventive bars 70 adjacent to each other.

Meanwhile, except for the wires 50 for controlling the rotation angles of the vane plates 40, the rotation suspending projections 60 can be established on both ends of the upper/lower support frames 30 to suspend the rotation of the vane plates 40.

When dividing the vane plates 40 numerously in order not to disturb the rotation of the vane plates 40, the respective divided vane plates 40 are set to rotate independently and the rotation angles of the respective divided vane plates are controlled by the rotation suspending projections 60 formed on the bend preventive members 250 mounted within the upper/lower support frames 30 in the horizontal direction.

Besides, it is possible to further establish the vane plates 40 on the auxiliary support frames 230 to be influenced by the wind.

Meanwhile, it is feasible to form a separation axis 270 to separate the central part of the central axis 10 and both ends of the separation axis 270 are joined with flanges 271, thus separating or combining the separation axis 270 from or with the central axis 10. The separation axis 270 is to remove the inconvenience that the upper/lower support frames 30 are to be detached completely from the central axis one by one when repairing disabled multi-direction wind power generation apparatus.

In addition, when manufacturing the multi-direction wind power generation apparatus, the separation axis 270 of the central axis 10 is separated and, then, the pivots 20 connected with the lower parts of the plural upper/lower support frames 30 are combined one by one and fixed. Next, the rotation bearing units 80 connected with the upper parts of the upper/lower support frames 30 are readily put into the central axis 10 separated by the separation axis 270, thus manufacturing the apparatus easily.

According to the present invention having the above described configuration, when the wind blows from a certain direction, the vane plates of one side adhere closely to the rotation preventive bars under the influence of the wind and move freely in the direction of the wind, and the vane plates of the other side are rotated to lessen the wind resistance and move freely in the opposite direction of the wind, thus making the rotation of the pivots smooth.

When the vane plates are rotated under the influence of the wind, the wire connected firmly with the rotation preventive bar is linked strongly to one side of the vane plate, thus controlling the rotation angle of the vane plate. Besides, the rotation suspending projection can interfere with one side of the vane plate to control the rotation angle.

Meanwhile, the plural pivots are put into the central axis and the vane plates mounted on the pivots connected adjacent to each other are rotated in the reverse direction to each other. Accordingly, the pivots connected adjacent to each other are rotated in the reverse direction to each other.

That is, when the first, second, third and fourth pivots are provided, the first and third pivots are rotated in a direction, whereas, the second and fourth pivots are rotated in the opposite direction.

Among the first to fourth pivots put into the central axis, when the vane plates of the first and third pivots move freely by adhering closely to the rotation preventive bars under the influence of the wind, the vane plates of the second and fourth pivots established within the vane plates of the first and third pivots move reversely by lessening the wind resistance.

Accordingly, the vane plates of the first to fourth pivots mounted on both sides of the central axis at regular intervals don't meet with the wind resistance at a time, but a portion of the vane plates move freely under the influence of the wind, thus making most use of the wind by minimizing the wind resistance.

Meanwhile, except for the influence of the wind, it can be influenced by the flow of sea water. Accordingly, it is possible to generate electricity using the flow of sea water.

In this case, the multi-direction wind power generation apparatus of the invention is put upside down to put the gear case established on the lower part of the central axis on the top. Here, since the nuts, means for preventing the separation of the upper/lower support frames, are put on the upper part of the central axis and the bearing units are fixed in the gear case, the central axis and the pivots are not separated, thus performing their own functions.

Since the wind has different velocities according to the altitude, the vane plates divided numerously and rotated independently can be readily rotated by a low wind velocity since they have light weights.

Accordingly, it is possible to enhance the rotation power of the pivots since the respective vane plates divided in view of the different wind velocities according to the altitude can be rotated efficiently and minimize the wind resistance.

Meanwhile, since the upper/lower support frames are supported firmly by the upper/lower supporters, the horizontal length of the upper/lower support frame to be established is not limited. Besides, the upper/lower supporters prevent the upper/lower support frames from drooping by their own weight and from moving freely in the vertical direction.

In addition, the cross-support members established on the outer circumference of the upper/lower support frames prevent the upper/lower support frames from rocking in the horizontal direction.

When the pivots are rotated by a high rotation power, the driving gears in the gear case transmit the rotation power of the pivots to the follower gears. Here, since the rotation directions of the pivots are opposite to each other, the driving gear of the pivot rotating in the reverse direction is engaged with the idle gear for converting the rotation direction, thus transmitting the converted rotation power to the follower gear.

The follower gear axis rotated by the follower gears transmits the rotation power to the electric generator by means of the transmission gear to generate electricity.

When repairing the multi-direction wind power generation apparatus of the present invention due to a mishap to the apparatus, especially when repairing the rotation bearing unit and the pivot, which are put into the central axis, the rotation bearing unit, the flange and the separation axis are to be detached from the central axis. Then, the rotation bearing unit and the pivot can be readily replaced or repaired through the central part of the central axis, from which the separation axis is separated, needless to detach the upper/lower support frames one by one from the central axis.

INDUSTRIAL APPLICABILITY

As described above, the multi-direction wind power generation apparatus in accordance with the present invention can generate electricity regardless of the wind direction, enhance the efficiency of electric generator by making most use of the wind and by lessening the wind resistance, increase the solidity of the apparatus by establishing separate supporters for supporting the upper/lower support frames, and be manufactured with a large size as well.

The invention claimed is:

1. In a multi-direction wind power generation apparatus including a central axis mounted vertically on the ground; a plurality of pivots inserted rotatably into the central axis; a plurality of upper/lower support frames established on outer circumference of the plural pivots at regular intervals; vane plates, which are provided on the outside of the upper/lower support frames and rotated or suspended by the wind so as to rotate the pivots; rotation control means for controlling rotation angles of the vane plates; driving gears, mounted on bottoms of the pivots, for transmitting rotation powers of the pivots; a follower gear axis including follower gears for receiving the rotation powers from the driving gears; and an electric generator for generating electricity by receiving the rotation power of the follower gear axis, wherein the rotation control means interfere with different sides of vane plates, respectively, so that the vane plates of the plural pivots adjacent to each other are rotated reversely to each other, the multi-direction wind power generation apparatus further comprising:

a gear case, established under the pivots, including the driving gears, the follower gears and the follower gear axis;

bearing units, provided on upper/lower sides of the driving gears mounted on the bottoms of the pivots and one side of the bearing unit is fixed inside the gear case, for supporting the pivots; and idle gears, engaged with lower driving gears of the pivots rotating in a reverse direction, for converting the rotation direction of the pivots rotating in the reverse direction when the pivots adjacent to each other are rotated in the reverse direction according as the vane plates are rotated in the reverse direction under the influence of the wind.

2. The multi-direction wind power generation apparatus as recited in claim 1, wherein separation preventive means are further established on an upper end of the central axis to prevent separation of the upper/lower support frames.

3. The multi-direction wind power generation apparatus as recited in claim 1, wherein a support frame supporting means is further provided to strongly supporting the upper/lower support frames.

4. The multi-direction wind power generation apparatus as recited in claim 3, wherein the support frame supporting means includes upper/lower supporters, of which one end is fixed rotatably on the central axis and the other end is mounted on one side of upper/lower part of the upper/lower support frame; auxiliary support frames having a shape of "□", provided between the upper/lower support frames plurally mounted on the outer circumference of the pivots; cross-support members, installed along with inner/outer circumferences of the upper/lower support frames and inner/outer circumferences of the auxiliary support frames, for supporting a lateral direction of the upper/lower support frames; and bend preventive members, established within the upper/lower support frames and the auxiliary support frames, through which the cross-support members go, for preventing the upper/lower support frames and the auxiliary support frames from being bent.

5. The multi-direction wind power generation apparatus as recited in claim 3, wherein the support frame supporting frame includes upper/lower supporters, of which one end is fixed rotatably on the central axis and the other end is mounted on one side of upper/lower part of the upper/lower support frame; cross-support members, installed along with inner/outer circumferences of the upper/lower support frames and inner/outer circumferences of the auxiliary support frames, for supporting a lateral direction of the upper/lower support frames; and bend preventive members, established within the upper/lower support frames, through which the cross-support members go, for preventing the upper/lower support frames, the vane plates are divided numerously so that rotations of vane plate are not disturbed by the cross-support members.

6. The multi-direction wind power generation apparatus as recited in claim 1, wherein the vane plates are divided numerously in a horizontal direction and the respective vane plates divided numerously rotate independently.

7. The multi-direction wind power generation apparatus as recited in claim 1, wherein a separation axis to be separated is further provided by cutting a central part of the central axis and recombined on the central axis by joining both ends of the separation axis by means of flanges.

* * * * *